G. J. LE MAY.
VALVE.
APPLICATION FILED MAY 18, 1912.
1,109,169.
Patented Sept. 1, 1914.
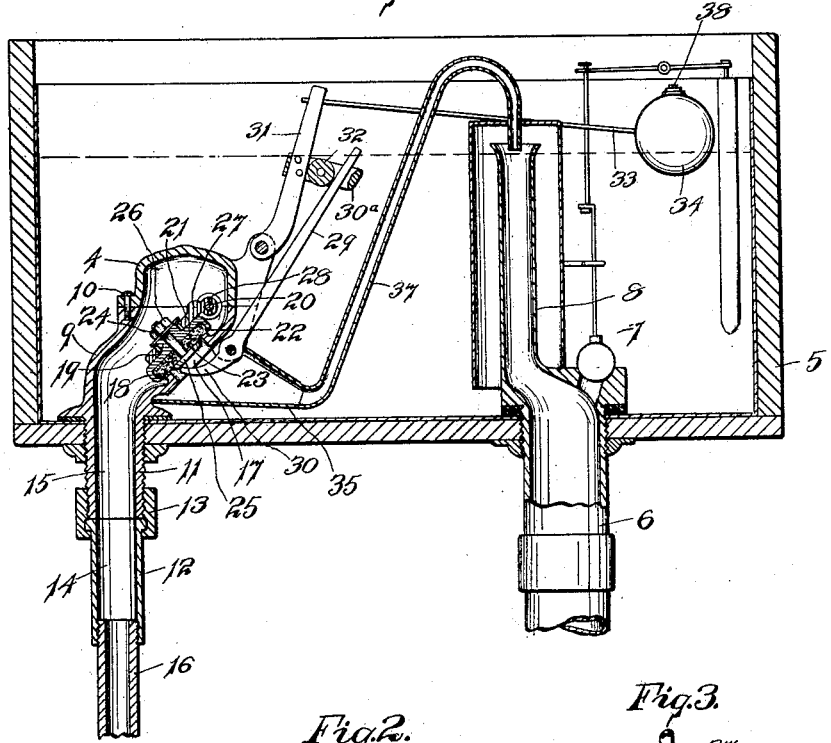
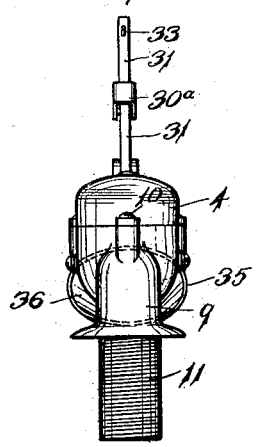
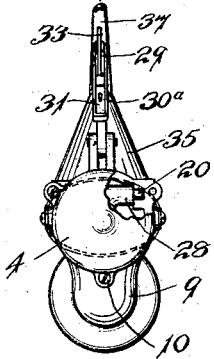
WITNESSES:
INVENTOR.
George J. Le May.
BY
Arthur B. Jenkins
ATTORNEY

UNITED STATES PATENT OFFICE.

GEORGE J. LE MAY, OF UNIONVILLE, CONNECTICUT.

VALVE.

1,109,169.  Specification of Letters Patent.  Patented Sept. 1, 1914.

Application filed May 18, 1912. Serial No. 698,182.

*To all whom it may concern:*

Be it known that I, GEORGE J. LE MAY, a citizen of the United States, and a resident of Unionville, in the county of Hartford and State of Connecticut, have invented a new and Improved Valve, of which the following is a specification.

My invention relates to the class of devices above named and an object of my invention among others is to provide a device of this class in which the noise incident to its operation and especially in stopping the flow of water shall be reduced to a minimum.

One form of device embodying my invention and in the construction and use of which the object hereinabove set out as well as others may be attained is illustrated in the accompanying drawings, in which—

Figure 1 is a view in section through a tank showing my improved valve. Fig. 2 is a side view of the valve looking from a point at right angles to the point of view of Fig. 1. Fig. 3 is a detail top view of the device with parts broken away to show construction.

While my invention is not limited to a valve of any particular description, it is especially applicable to a valve used in connection with flush tanks, and therefore such a valve has been selected by me for the illustration herein as an aid in imparting the invention.

In the accompanying drawings the numeral 5 denotes a tank of ordinary form and construction having an outlet pipe 6, with flushing apparatus of any ordinary form and construction and which is generally denoted by the numeral 7, this flushing apparatus including one leg 8 of a siphon.

The mechanism above described being of well-known form further and detailed description is deemed unnecessary and is therefore omitted.

The numeral 9 denotes a valve body that may be composed of any desired material and of any suitable form, this body having a cap 4 removably secured to the body as by means of screws 10 passing through a flange or ears into threaded openings in the body. This cap serves as a means for closing the opening into the valve body through which opening access may be readily had to parts within the body. The body has an extension 11 projecting through the bottom of the tank and secured to a tail-piece 12 as by a coupling 13. This tail-piece has an opening 14 equal in size to the opening 15 through the projection 11, and the inlet pipe 16 has a passage smaller in size than the passage through the tail-piece and projection 11. It will be noted that the valve closes with the pressure and by gradually increasing the size of the passage into the valve body an easy flow of water into such valve body results and consequently the force upon the valve in its closing movement is reduced.

An outlet 17 opens downward from the valve body or case, a valve seat 18 being formed about this opening and a valve is suitably mounted to control the flow of fluid through the opening. This valve is so located and arranged that it may be taken from the valve body as for the purpose of repacking and replaced without taking the valve body from the tank, the construction and attachment of the cap 4 enabling this to be readily done, as will be clearly seen from the illustrations in Figs. 1 and 3 from which it will be noted that the recesses for the pivot pin 20 are located half of each recess in the cap and a half in the valve body so that when the cap is removed the valve may be lifted out of its place.

The valve includes a valve cap 21 having a lip 22 within which a packing 23 is removably held as by means of a threaded stud 24 having a head 25 secured as by means of a nut 26. The cap 21 has a hub 19 loosely fitting within an opening in a valve support 27, this opening being somewhat larger than the hub and the nut 26 rests against the end of this hub, there being a space between a flange on the nut and the upper surface of the support 27 so that the valve is readily movable in its support and is therefore self-adjusting to properly rest against the seat 18 and tightly close the opening therein. A knuckle 28 is formed on the support and the pin 20 passes through this knuckle to pivotally retain the valve in proper position.

A valve lever 29 is pivotally supported on the body and has a valve finger 30 projecting in position to rest against the under side of the head 25 of the stud 24. The end of this valve finger 30 rests against the head 25 of the stud at some distance from the center so that the force applied to lift the valve from its seat will be exerted near one edge and the valve tipped and this edge first released. This manner of opening the valve will require much less force than in a structure in which the force is applied to the center of the valve to lift it evenly from its seat.

An arm 30ª is secured to a float lever 31 and loosely engages with the valve lever 29 that passes through the arm, a sheave 32 pivotally mounted between the sides of the arm engaging the valve lever to insure its easy movement. A float rod 33 bearing a float 34 is secured to the float lever 31.

An apron 35 is secured to the valve body, this apron being in the form of a funnel located opposite the opening 17, so that when the valve is opened the water will flow into this apron and then over the sides through the mouth 36. An after-fill pipe 37 extends from the small end of the funnel-shaped apron and discharges into the leg 8 of the siphon for the purpose of providing an after-fill for a bowl in a manner well understood in devices of this class.

It will be noted that the closing movement of the valve is in the same direction as that of the pressure of the water so that the water pressure is employed to close the valve. It is essential, however, that this closing movement shall not be so rapid as to cause "water hammer" and to this end the float 34 is made use of to oppose the force of the water in closing the valve, and in order to enable the float to properly resist the force of water the levers are arranged as herein shown, the valve lever 29 being directly in contact with the valve that is pivotally mounted inside of the valve body to close the opening through the wall of that body, which affords an extremely simple construction.

For the purpose of regulating the amount of resistance of the float to the closing movement of the valve the float is supplied with a cap 38 by means of which sand or other material may be put into the hollow float to increase or lessen its weight. The construction thus provides means whereby the closing movement of the valve may be so regulated as to prevent such rapid movement as to cause "water hammer" and such slow closing movement as to cause a whistling sound.

The valve as a whole is an extremely simple structure, the pivotally mounted valve located inside of the body being extremely efficient and protected from injury, and the construction of the valve and the opening into the body is such as to enable ready access to be obtained to the parts for any purpose.

While I have shown and described herein a form of valve embodying my invention it is not necessary that a structure shall be made in exact accordance with that shown to embody the invention.

I claim—

1. A valve body having an inlet opening and an outlet opening and a valve seat around the latter, a valve pivotally mounted within the body to control said outlet opening, a pivotally mounted valve lever to operate said valve, a pivotally mounted float lever having a float, and a connection between the valve lever and float lever, said connection being located on the same side of the fulcrum of each of said levers.

2. A valve body having an inlet opening and an outlet opening with a valve seat around the latter, a pivotally mounted valve located within the body to control said outlet opening, a pivotally mounted valve lever to operate said valve, a pivotally mounted float lever, said levers extending in the same general direction and one along side of the other, and a connection between said levers.

3. A valve body having an inlet opening and an outlet opening with a valve seat around the latter, a valve pivotally mounted within the valve body to control said outlet opening, a pivotally mounted valve lever to operate said valve, a pivotally mounted float lever having a float attached thereto, said levers extending in the same general direction and one along side of the other, and an arm loosely connecting said levers.

4. A valve body having an inlet opening and an outlet opening with a valve seat around the latter, a valve pivotally mounted within the body to control said outlet opening, a pivotally mounted valve lever located outside of the body with one end in engagement with but disconnected from said valve, a pivotally mounted float lever having a float attached thereto, said levers extending in the same general direction and one along side of the other, and an arm loosely connecting said levers.

5. A valve body having an inlet opening, and an outlet opening through the wall thereof, a valve pivotally mounted within the body to control the flow of liquid through the outlet opening, a valve lever pivotally mounted on the valve body and in engagement with but disconnected from the valve, a float lever pivotally connected to the body, and an arm loosely connecting the valve and float levers.

6. A valve body having an inlet opening, and an outlet opening through the wall thereof, a valve pivotally mounted within the body to control the flow of liquid through the outlet opening, a valve lever pivotally mounted on the valve body to operate said valve, a float lever pivotally connected to the body, and an arm connecting said levers, and comprising a sheave mounted on the arm and in engagement with one of said levers.

7. A valve body having an inlet opening, and an outlet opening through the wall thereof, a valve pivotally mounted within the body to control the flow of liquid through the outlet opening, a valve lever pivotally mounted on the valve body and in engagement with the valve, means for operating the valve lever, and a hood located to receive therein the direct flow of water from said opening, said hood having a mouth located about the valve body.

8. A valve body having an inlet opening, and an outlet opening through the wall thereof providing a seat surrounding said outlet opening, a valve pivotally mounted within the valve body and coöperating with said seat to control the flow of liquid through said outlet opening, a valve lever pivotally connected with the body and in engagement with said valve, means for operating the valve lever, and an apron of funnel shape surrounding the outlet opening from the valve, to receive therein the direct flow of water from said opening and having a mouth opening into the tank about the valve body, said apron also having an outlet from the small end thereof.

9. A valve body having inlet and outlet openings at the under side thereof, a pivotally mounted valve located within the body to control the outlet opening, a valve lever pivotally supported outside of the valve body and having one end in engagement with said valve, a float lever pivotally mounted on the valve body, said levers extending in the same general direction, one along side of the other, a float attached to the float lever, and a loose connection between said levers.

GEORGE J. LE MAY.

Witnesses:
T. S. WHEELER,
E. C. HEACOX.

---

Copies of this patent may be obtained for five cents each, by addressing the "Commissioner of Patents, Washington, D. C."